United States Patent
Michalakos et al.

(10) Patent No.: US 7,473,402 B2
(45) Date of Patent: Jan. 6, 2009

(54) OZONE REMOVAL SYSTEM AND METHOD FOR LOW AND HIGH TEMPERATURE OPERATION

(75) Inventors: Peter M. Michalakos, Chicago, IL (US); Robert Tom, Redondo Beach, CA (US)

(73) Assignee: Honeywell International, Inc., Morristown, NJ (US)

( * ) Notice: Subject to any disclaimer, the term of this patent is extended or adjusted under 35 U.S.C. 154(b) by 755 days.

(21) Appl. No.: 10/811,378

(22) Filed: Mar. 26, 2004

(65) Prior Publication Data

US 2005/0214186 A1    Sep. 29, 2005

(51) Int. Cl.
*B01J 23/58*    (2006.01)
*B01J 23/44*    (2006.01)
*B01J 23/42*    (2006.01)
*B01J 23/48*    (2006.01)
*B01J 23/50*    (2006.01)

(52) U.S. Cl. .................. 422/129; 502/330; 502/333; 502/339; 502/348

(58) Field of Classification Search ................. 422/129; 502/330, 333, 339, 348
See application file for complete search history.

(56) References Cited

U.S. PATENT DOCUMENTS

| | | | |
|---|---|---|---|
| 4,759,918 A | 7/1988 | Homeier et al. | |
| 4,920,088 A | 4/1990 | Kolts | |
| 4,967,565 A * | 11/1990 | Thomson et al. ............... | 62/57 |
| 5,080,882 A | 1/1992 | Yoshimoto et al. | |
| 5,141,714 A | 8/1992 | Obuchi et al. | |
| 5,187,137 A * | 2/1993 | Terui et al. ................... | 502/241 |
| 5,336,651 A | 8/1994 | Yoshimoto et al. | |
| 5,422,331 A | 6/1995 | Galligan et al. | |
| 5,620,672 A | 4/1997 | Galligan et al. | |
| 5,935,529 A | 8/1999 | Saito et al. | |
| 6,022,825 A | 2/2000 | Anderson et al. | |

(Continued)

FOREIGN PATENT DOCUMENTS

EP    0 233 642 A2    8/1987

(Continued)

OTHER PUBLICATIONS

English Abstract of JP 03151046 A (Jun. 27, 1991).*

(Continued)

*Primary Examiner*—Alexa D. Neckel
*Assistant Examiner*—Matthew J Merkling
(74) *Attorney, Agent, or Firm*—Oral Caglar, Esq.

(57) ABSTRACT

Apparatus, systems, and methods for the efficient decomposition of ozone in an air stream from an air intake of an aircraft. The apparatus includes a titania catalyst support on a substrate, and a catalyst composition on the titania. The catalyst composition comprises a silver-based component, comprising silver metal or silver oxide, and a palladium-based component comprising an oxide of palladium or palladium metal. The air stream may be from a dedicated ambient air compressor or from bleed air from a gas turbine engine. The invention allows for the effective removal of ozone from the air stream to provide cleansed air having an ozone level of 0.1 ppm or less over a range of operating temperatures from 100 to 500° F. and above during a service period of at least 20,000 hours or a time period of not less than 5 years.

17 Claims, 4 Drawing Sheets

U.S. PATENT DOCUMENTS

| | | |
|---|---|---|
| 6,025,297 A | 2/2000 | Ogura et al. |
| 6,203,771 B1 | 3/2001 | Lester et al. |
| 6,214,303 B1 | 4/2001 | Hoke et al. |
| 6,503,462 B1 | 1/2003 | Michalakos et al. |
| 6,576,199 B1 | 6/2003 | Liu et al. |
| 2003/0150222 A1* | 8/2003 | Mirowsky et al. ............... 62/78 |

FOREIGN PATENT DOCUMENTS

| | | | |
|---|---|---|---|
| EP | 0 367 574 A | | 5/1990 |
| GB | 2056424 A | * | 3/1981 |
| JP | 03151046 A | * | 6/1991 |

OTHER PUBLICATIONS

B. Dhandapani, S.T. Oyama, *Gas phase ozone decomposition catalysts*, Applied Catalysis B: Environmental 11 (1997) 129-166, Elsevier.

* cited by examiner

OZONE REMOVAL SYSTEM AND METHOD FOR LOW AND HIGH TEMPERATURE OPERATION

BACKGROUND OF THE INVENTION

The present invention relates to apparatus, systems, and methods for the catalytic removal of ozone from air, and more particularly, to the removal of ozone from an air stream supplied to an interior air space.

Conventional commercial aircraft feed bleed air from a gas turbine engine to an environmental control system (ECS) and thence to an interior air space, e.g., cabin or flight deck of the aircraft. The ECS conditions the air it receives in terms of pressure, temperature, and humidity to provide for the comfort of flight crew and passengers. However, the ECS does not remove pollutants, such as ozone, from the air stream supplied to the aircraft cabin and flight deck.

Modern jet (gas turbine engine) aircraft are typically designed for fuel-efficient operation at relatively high altitudes of 25,000 feet or more where the atmospheric ozone content is relatively high. The ozone concentration may depend on a number of factors, such as the altitude, geographic location, time of year, etc. The ozone concentration in the atmosphere is typically in the range of from about 0.2 to 2.0 ppm. The upper limit permitted by FAA regulations for the ozone concentration in cabin air of commercial aircraft is 0.1 ppm. Excessive levels of ozone can cause a number of medical problems, including lung and eye irritation, headaches, fatigue, and breathing discomfort.

In the prior art, catalytic converters have used palladium as a catalyst to reduce the concentration of ozone in the bleed air from the engines to an acceptable level. The bleed air temperature on most aircraft systems is above 300° F. Newer aircraft may use dedicated ambient air compressors to provide an air stream, to be fed to the ECS, at a temperature substantially less than 300° F. (for example, from about 100 to 200° F.). However, the efficiency of palladium for the catalytic removal of ozone decreases at temperatures below about 300° F. In addition, palladium is reversibly deactivated when exposed to lower temperatures, e.g., less than about 300° F. For example, the catalytic activity of palladium may decline during exposure to a constant temperature in the range of from about 100 to 300° F.

Certain prior art catalytic converters for the removal of ozone have used alumina as a catalyst support. Alumina is susceptible to the deactivation of palladium catalyst thereon, for example, by poisoning from sulfur- and phosphorus-containing compounds. In an attempt to protect palladium supported on alumina from phosphorus induced catalyst deactivation, palladium has been combined with a transition metal, such as Ni or Mn, as a co-catalyst.

However, the vulnerability of catalysts to sulfur-containing contaminants may increases when transition metals are used, because transition metals may form sulfates.

U.S. Pat. No. 5,080,882 to Yoshimoto et al., discloses a catalyst structure and method for ozone decomposition, wherein the catalyst structure comprises a thin carrier material having a catalyst supported thereon. The catalyst may include a zeolite (aluminosilicate) containing Cr, Zn, V, W, Fe, Mo, Ni, Co, Ru, Cu, Rh, Pd, Ag, or Pt, or an oxide thereof.

U.S. Pat. No. 5,422,331 to Galligan et al. discloses a layered catalyst composition having a refractory metal oxide underlayer and a refractory metal oxide overlayer on a metal substrate, together with one or more catalytic metal components dispersed on the overlayer. The catalytic metal components may include a palladium component and a manganese component. A chloride ion scavenger, such as silver oxide, may be used to prevent corrosion of the metal substrate.

U.S. Pat. No. 6,214,303 to Hoke et al. discloses the removal of various pollutants from the atmosphere by passing air over a stationary substrate. Catalyst materials may be supported on a refractory metal oxide. Useful catalyst compositions disclosed by Hoke et al. for the decomposition of ozone include $MnO_2$, $Mn_2O_3$, CuO, Carulite®, carbon, Pd, and Pt.

EP 0233642 A2 to Cornelison et al. discloses a process for hydrogenation of organic compounds (fats and oils) using a hydrogenation catalyst. The catalyst comprises a metal substrate, a washcoat on the substrate, and a catalytic metal on the washcoat. The washcoat may be alumina, titania, silica, magnesia, or a zeolite; and the catalytic metal may be Pd, Pt, Ni, Cu, Ag, or mixtures thereof.

As can be seen, there is a need for a catalyst system and method for ozone removal from an air stream being supplied to an interior air space, wherein the catalyst system includes a low-temperature catalyst in combination with a high-temperature catalyst, such that the system can operate efficiently at both a relatively low temperature, e.g., less than 300° F., and a relatively high temperature, e.g., 300° F. and above.

There is a further need for a catalyst system and method for ozone removal from an air stream over an extended service period, wherein the catalyst system is resistant to deactivation by contaminants, such as S- and P compounds, and wherein a catalytic composition of the catalyst system does not require the inclusion of a transition metal. There is still a further need for a catalyst system for the effective removal of ozone from an air stream, wherein the system can be operated over an extended period of time without the need to replace or service the catalyst system.

SUMMARY OF THE INVENTION

In one aspect of the present invention, there is provided an ozone removal system for an aircraft comprising a housing having an upstream end and a downstream end; a substrate disposed within the housing, the substrate and the housing adapted for the passage of an air stream therethrough; a titania catalyst support disposed on a surface of the substrate; a first duct affixed to the upstream end of the housing, the first duct coupled to an air intake unit for providing the air stream; and a catalytic composition disposed on the titania catalyst support. The catalytic composition may comprise at least one silver-based component, such as Ag (silver) metal or AgO (silver oxide), and at least one palladium-based component, such as PdO (palladium oxide), $PdO_2$ (palladium dioxide), or Pd (palladium) metal. The catalytic composition may be adapted for the efficient catalytic removal of ozone from the air stream at temperatures within the range of from about 100 to 500° F.

In another aspect of the present invention, there is provided an ozone removal system comprising a housing having an upstream end and a downstream end, a substrate disposed within the housing, a layer of titania disposed on a surface of the substrate, and a catalytic composition disposed on the layer of titania. The catalytic composition may comprise a first catalytic component capable of the efficient decomposition of ozone within a first temperature range, and a second catalytic component capable of the efficient decomposition of ozone within a second temperature range, wherein the first catalytic component consists essentially of Ag (silver) metal, and the first temperature range is from about 100 to 300° F.

In still another aspect of the present invention, there is provided a catalytic system for removing ozone from an air stream comprising an air intake unit for providing the air stream, a catalytic unit disposed downstream from the air intake unit, a first duct affixed to an upstream end of the catalytic unit for channeling the air stream to the upstream end of the catalytic unit, and a second duct affixed to a downstream end of the catalytic unit. The catalytic unit may comprise a housing, a substrate disposed within the housing, a layer of titania disposed on a surface of the substrate, and a catalytic composition disposed on the layer of titania. The catalytic composition may comprise a first catalytic component adapted for efficient removal of ozone from an air stream within a first temperature range, and a second catalytic component adapted for efficient removal of ozone from an air stream within a second temperature range. The first catalytic component may comprise silver, and the second catalytic component may comprise palladium oxide (PdO), wherein the second catalytic component is reversibly deactivated at temperatures below the second temperature range, and wherein the second temperature range is from about 300 to 500° F.

In yet another aspect of the present invention, there is provided an aircraft having an interior air space, the aircraft comprising an ozone removal system including a catalytic unit in communication with the interior air space. The catalytic unit may be adapted for passage of an air stream therethrough at a flow rate of from about 1 to 500 pounds of air per minute. The catalytic unit may comprise a first catalytic component adapted for efficient catalytic removal of ozone from the air stream over a first temperature range, and the catalytic unit may further comprise a second catalytic component adapted for efficient catalytic removal of ozone from the air stream over a second temperature range. The first temperature range may be from about 100 to 300° F., and the second temperature range may be from about 300 to 500° F. The catalytic unit may further comprise a substrate, a titania catalyst support disposed on the substrate, and a catalytic composition disposed on the titania catalyst support. The catalytic composition comprises the first catalytic component and the second catalytic component. The first catalytic component may consist essentially of silver, and the second catalytic component may consist essentially of PdO (palladium oxide).

In a further aspect of the present invention, there is provided a method for the catalytic removal of ozone from an air stream, the method comprising providing a catalytic unit adapted for the passage of the air stream therethrough, wherein the catalytic unit comprises a substrate disposed within a housing, a layer of titania disposed on a surface of the substrate, a catalytic composition disposed on the layer of titania. The catalytic composition may comprise a first catalytic component capable of the efficient decomposition of ozone within a first temperature range, and a second catalytic component capable of efficient decomposition of ozone within a second temperature range, wherein the second catalytic component is reversibly deactivated at temperatures below the second temperature range. The method further comprises providing the air stream including ozone, passing the air stream at a flow rate of from about 5 to 500 pounds of air per minute through the catalytic unit, and catalytically decomposing the ozone by contacting the air stream with the catalytic composition.

In a still further aspect of the present invention, there is provided a method for the catalytic removal of ozone from an air stream, the method comprising compressing ambient air to provide the air stream at a temperature of from about 100 to 500° F., passing the air stream over a catalytic composition at a flow rate of from about 5 to 500 pounds of air per minute, and catalytically decomposing the ozone in the air stream to provide cleansed air having an ozone concentration of 0.1 ppm or less, wherein the catalytic composition comprises silver metal and palladium oxide (PdO), and wherein the catalytic composition is disposed on titania.

In yet a further aspect of the present invention, there is provided a method for making an ozone removal catalytic system for removing ozone from an air stream, wherein the method involves providing an ozone removal catalytic unit. The ozone removal catalytic unit may be provided by supplying a substrate, applying a titania catalyst support layer to the substrate to provide a coated substrate, depositing an ozone removal catalytic composition on the titania catalyst support layer to provide a catalytic coated substrate, providing a housing for accommodating the catalytic coated substrate, and arranging the catalytic coated substrate within the housing. The catalytic composition may comprise a first catalytic component comprising silver, and a second catalytic component comprising palladium oxide (PdO), wherein the first catalytic component is in an amount of from about 50 to 500 g/ft$^3$ of the substrate, and the second catalytic component is in an amount of from about 25 to 300 g/ft$^3$ of the substrate.

These and other features, aspects and advantages of the present invention will become better understood with reference to the following drawings, description and claims.

DETAILED DESCRIPTION OF THE INVENTION

Figure 1:
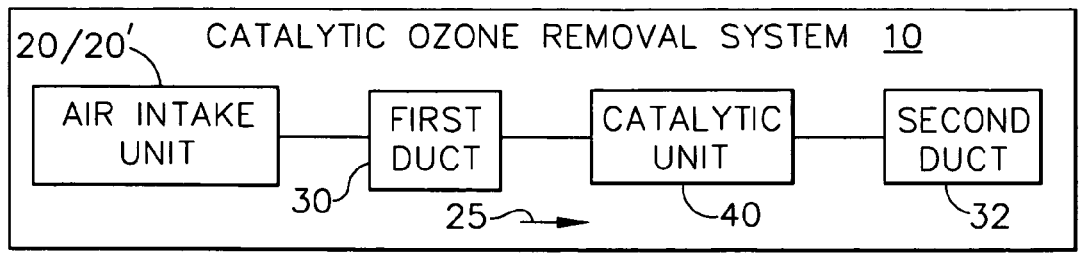
FIG. 1 is a block diagram schematically representing a catalytic ozone removal system, according to one embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides apparatus, systems, and methods for removing ozone from an air stream, and for providing cleansed air to an interior air space, such as a cabin or flight deck of an aircraft. As an example, the present invention may be used to provide cleansed air, having an ozone concentration of 0.1 ppm or less, to the interior air space(s) of a commercial aircraft, such as a passenger aircraft. The cleansed air may be provided by passing the air stream over a catalyst composition of the invention. The air stream may be derived either from engine bleed air (i.e., air provided by the compressor of a gas turbine engine), or from a dedicated ambient air compressor.

The present invention may be used for the efficient removal of ozone over a broad range of temperatures, e.g., from as low as about 100° F. up to a maximum temperature (typically below 500 °F.) likely to be provided by an aircraft air intake unit. Because of the effectiveness of catalyst compositions of the present invention at temperatures below 300° F., the present invention is suitable for use in aircraft which use a dedicated ambient air compressor for providing an air stream to be supplied to the cabin. The present invention may also be suitable for use in aircraft which use bleed air from a gas turbine engine to provide an air stream. Ozone removal apparatus and methods of the present invention may also be applicable to other vehicles, or to buildings, in which it is desired, or required, to remove ozone from an air stream to be delivered to an interior air space.

An air stream to be supplied to an interior air space of an aircraft may contain ozone at levels well above the maximum level (presently 0.1 ppm) permitted by the FAA. Depending on factors such as geographic location, the time of year, and the altitude, the ozone concentration in an air stream derived from an air intake unit of an aircraft may typically be in the range of from about 0.2 to 2.0 ppm.

In prior art aircraft and prior art ozone removal apparatus, bleed air from a gas turbine engine has been passed, at a temperature above 300° F., over a catalyst composition comprising palladium and a transition metal, wherein the catalyst composition is supported on a material such as alumina.

Newer aircraft may use dedicated ambient air compressors such that the air stream supplied to the catalyst is at a temperature as low as 100° F. However, the efficiency of palladium for the catalytic removal of ozone reversibly deactivated when exposed to lower temperatures, e.g., less than about 300° F. For example, the catalytic activity of palladium may decline during exposure to a constant temperature in the range of from about 100 to 300° F.

In contrast to the prior art, ozone removal apparatus of the present invention may include a catalyst composition comprising a low temperature catalytic component and a high temperature catalytic component, wherein the low temperature catalytic component efficiently removes ozone from an air stream within a first temperature range, and wherein the high temperature catalytic component efficiently removes ozone from the air stream within a second temperature range. The first temperature range may be substantially below 300° F., and may be in the range of from about 100 to 300° F. and above. The second temperature range may be in the range of from about 300 to 500° F. and above.

Certain prior art catalytic converters for the removal of ozone have used alumina as a catalyst support. Alumina is susceptible to the deactivation of palladium catalyst thereon, for example, by poisoning from sulfur- (S) and phosphorus (P) containing compounds. In an attempt by prior art systems to protect palladium supported on alumina from P induced catalyst deactivation, palladium has been combined with a transition metal, such as Ni or Mn as a co-catalyst. However, in such prior art systems the alumina and transition metals may be susceptible to deactivation by S.

In further contrast to the prior art, ozone removal apparatus of the present invention may include a titania layer for supporting the low temperature catalyst and the high temperature catalyst thereon. Titania is less susceptible than alumina to poisoning of a catalyst supported thereon by a contaminating material, such as a S- or P compound. Thus, titania offers resistance to sulfur- and phosphorus-containing compounds compared to conventional ozone catalyst supports comprising alumina.

As a result of the increased resistance to catalyst deactivation exhibited by titania upon exposure to air from an aircraft air intake unit, and unlike the prior art, a catalyst composition of the present invention may lack a transition metal, and at the same time may efficiently remove ozone from an air stream over an extended period of operation of at least 20,000 hours, or for a time period of at least 5 years, without replacing the catalyst composition or otherwise servicing the ozone removal apparatus of the instant invention.

Broadly, the present invention provides systems, apparatus, and methods for the efficient removal of ozone from an air stream, such as an air stream from an air intake of an aircraft. Apparatus of the present invention may include a first catalytic component, such as silver metal, for ozone removal at a relatively low temperature (e.g., as low as 100° F.), in combination with a second catalytic component, such as palladium oxide, for ozone removal at a relatively high temperature (e.g., 300° F. and above), wherein both the first catalytic component and the second catalytic component are supported on a layer of titania.

The first catalytic component and the second catalytic component may catalytically decompose ozone independently of each other. As a result, the present invention may provide for the efficient removal of ozone from an air stream, whether the air stream emanates from a gas turbine engine at a temperature of 300° F. and above, or from a dedicated ambient air compressor at a temperature as low as 100° F.

The first catalytic component, for example silver, does not deactivate when exposed to temperatures below 300° F. Therefore, the present invention provides efficient catalytic conversion of ozone throughout the entire temperature range of an air stream from an aircraft intake, for example, from about 100° to about 500° F. However, the invention need not be limited to ozone destruction in an aircraft, but may also be employed in other situations where catalytic ozone decomposition is desired over a broad temperature range. Ozone spontaneously dissociates to oxygen at a temperature of about 800° F.

FIG. 1 is a block diagram schematically representing a catalytic ozone removal system 10, according to one embodiment of the invention. Catalytic ozone removal system 10 may include an air intake unit 20/20', which may be coupled to, or in fluid communication with, a catalytic unit 40 via a first duct 30. Air intake unit 20/20' may provide an air stream 26 (e.g., FIGS. 3A-B) for passage to catalytic unit 40 via a first duct 30. First duct 30 may be coupled to an upstream end or portion of catalytic unit 40.

Catalytic ozone removal system 10 may further include a second duct 32 coupled to a downstream end or portion of catalytic unit 40. Second duct 32 may serve to couple catalytic unit 40 to an environmental control system (ECS) of an aircraft or other vehicle (e.g., FIG. 2). ECS of aircraft are well known in the art. The direction of air flow may be as indicated by arrow 25. Catalytic ozone removal system 10 may be used for catalytic ozone removal from air in an aircraft or other vehicle having an interior air space, such as a cabin, or from air in a building, and the like.

Figure 3A:
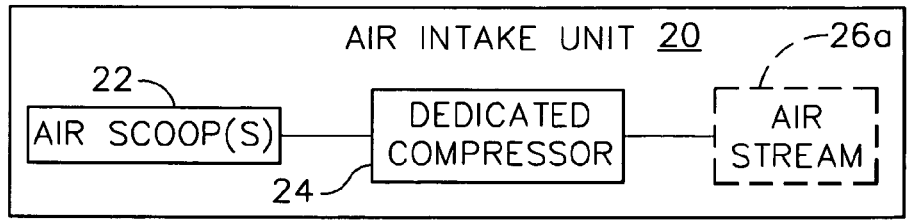
FIGS. 3A-B are block diagrams, each schematically representing an air intake unit for a catalytic ozone removal system, according to the invention.
Figure 3B:
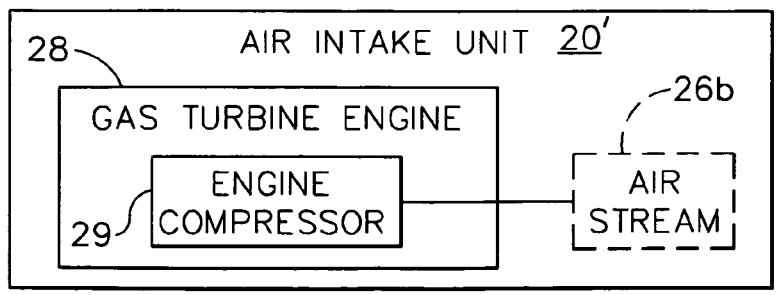

Again with reference to FIG. 1, air intake unit 20/20' may comprise a dedicated ambient air compressor (e.g., FIG. 3A), or a compressor of a gas turbine engine (e.g., FIG. 3B). Catalytic unit 40 may include a metal oxide catalyst support 46 disposed on a substrate 44, and a catalytic composition 48 disposed on or within catalyst support 46 (e.g., FIGS. 4, 6A-B).

Catalytic composition 48 may typically include a first catalytic component 48a and a second catalytic component 48b (e.g., FIG. 6B), wherein first catalytic component 48a and second catalytic component 48b may have different temperature requirements to avoid catalytic deactivation thereof. For example, second catalytic component 48b may lose ozone removal catalytic activity at a first temperature, while first catalytic component 48a may retain ozone removal catalytic activity at the first temperature.

Further, first catalytic component 48a and second catalytic component 48b may express efficient catalytic ozone removal within different temperature ranges. For example, first catalytic component 48a may express efficient catalytic ozone removal within a first temperature range, e.g., from about 100 to 300° F. or above; while second catalytic component 48b may express efficient catalytic ozone removal within a second temperature range, e.g., from about 300 to 500° F. or above.

Figure 2:
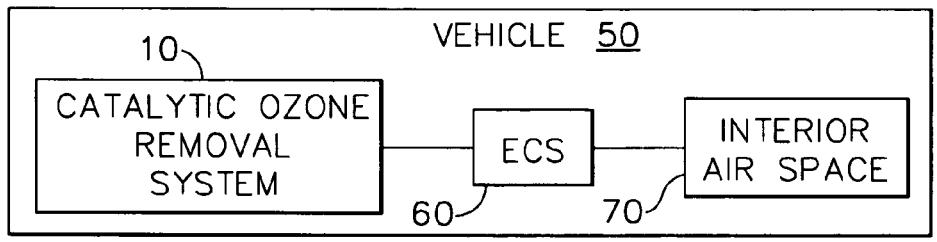
FIG. 2 is a block diagram schematically representing a vehicle including a catalytic ozone removal system, according to another embodiment of the invention.

FIG. 2 is a block diagram schematically representing a vehicle 50, which may include a catalytic ozone removal system 10, according to another embodiment of the invention. Vehicle 50 may be an aircraft, such as a commercial gas turbine engine (jet) aircraft, or a land vehicle, and the like. Catalytic ozone removal system 10 may include those elements and features described herein, for example, with reference to FIG. 1. Catalytic ozone removal system 10 may provide for the efficient catalytic decomposition of ozone from an air stream 26 (see, e.g., FIGS. 5, 6B).

Vehicle 50 may further include an environmental control system (ECS) 60. ECS 60 may be located downstream from catalytic ozone removal system 10. ECS 60 may be coupled to catalytic ozone removal system 10 via second duct 32 (see, FIG. 1). Vehicle 50 may further include an interior air space 70. Interior air space 70 may be in communication with catalytic unit 40 of catalytic ozone removal system 10 via ECS 60.

Catalytic ozone removal system 10 may supply a stream of cleansed air, having an ozone concentration of 0.1 ppm or less, to ECS 60. In the case of an aircraft, ECS 60 may condition the air it receives from catalytic ozone removal system 10, in terms of pressure, temperature, and humidity, for subsequent delivery to interior air space 70. Interior air space 70 may comprise an aircraft cabin, a flight deck, and the like.

One or more air cleaner units (not shown), for removal of particulates and organic pollutants, may be located upstream or downstream from ECS 60. Air cleaner units for an air quality system are described in commonly assigned, co-pending U.S. patent application Ser. No. 10/660,354 (entitled Cabin Air Quality System), filed Sep. 10, 2003, the disclosure of which is incorporated by reference herein in its entirety.

FIGS. 3A-B are block diagrams, each schematically representing an air intake unit for a catalytic ozone removal system 10, according to the invention. With reference to FIG. 3A, air intake unit 20 may include one or more air scoops 22 for receiving ambient air. Air scoops 22 may be located on the exterior of an aircraft, for example, on the belly of an aircraft. Air intake unit 20 may further include a dedicated ambient air compressor 24, in communication with air scoops 22. During compression, ambient air may be heated by dedicated ambient air compressor 24 to provide an air stream 26a. The temperature of air stream 26a may be substantially below 300° F. The temperature of air stream 26a may be typically at least about 100° F., usually from about 100 to 250° F., and often from about 100 to 200° F.

With reference to FIG. 3B, air intake unit 20' may include an engine compressor 29. Engine compressor 29 may be integral with a gas turbine engine 28. Bleed air from engine compressor 29 may be extracted to provide air stream 26b. The temperature of air stream 26b from engine compressor 29 may be typically at least about 300° F. Typically, air stream 26b may have a temperature in the range of from about 300 to 500° F., usually from about 300 to 425° F., and often from about 300 to 400° F. Air streams 26a, 26b may extend downstream from air intake units 20, 20', respectively (see, e.g., FIG. 5). The concentration of ozone in ambient air, for example, in air streams 26a, 26b prior to passage through catalytic unit 40, may be typically in the range of from about 0.2 to 2.0 ppm, i.e., at a level two to 20 fold (2-20×) higher than permitted by the FAA in a commercial aircraft cabin.

Air intake units 20 and 20' of FIGS. 3A-B may represent exemplary air intake units. However, other air intake units or mechanisms for generating a stream of air are also within the scope of the invention. Similarly, air streams generated by a mechanism or air intake unit other than those of FIGS. 3A-B are also possible under the invention.

Figure 4:
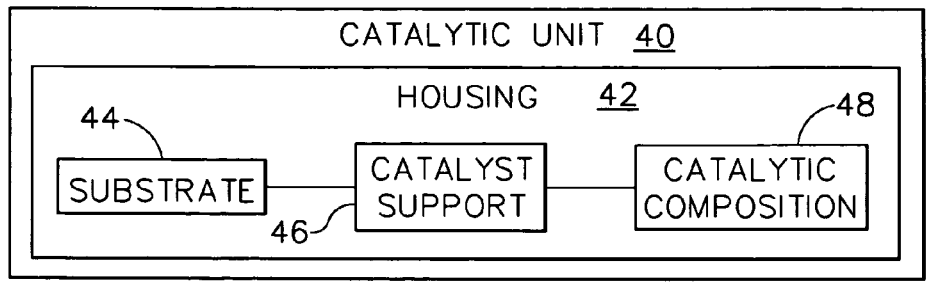
FIG. 4 is a block diagram schematically representing a catalytic unit for a catalytic ozone removal system, according to another embodiment of the invention.

FIG. 4 is a block diagram schematically representing a catalytic unit 40 for a catalytic ozone removal system 10, according to another embodiment of the invention. Catalytic unit 40 may include a housing 42, and a substrate 44 disposed or arranged within housing 42. Catalytic unit 40 may further include a catalyst support 46 disposed on substrate 44. Catalytic unit 40 may still further include a catalytic composition 48 disposed on catalyst support 46.

Housing 42 may comprise an enclosure, which may comprise, for example, a metal such as steel, aluminum, or various alloys, and the like. Substrate 44 may comprise, for example, a ceramic, or a metal such as steel, aluminum, or various alloys, and the like. Substrate 44 may have a three-dimensional configuration adapted to provide a relatively large surface area per unit volume. The configuration and composition of housing 42 and substrate 44 may be to some extent a matter of design choice. Configurations for catalytic substrates or monoliths, such as honeycomb structures, and the like, are well known in the art.

Catalyst support 46 may comprise a layer of a metal oxide applied to a surface of substrate 44. In some embodiments, catalyst support 46 may comprise titania. Catalyst support 46 may have a plurality of pores therein (see, e.g., FIG. 6B). Catalytic composition 48 may comprise at least two catalytic components (e.g., FIG. 6B). Each of the two or more two catalytic components of catalytic composition 48 may be independently capable of the efficient decomposition, or removal, of ozone from an air stream. Each component of catalytic composition 48 may catalytically decompose ozone to form oxygen.

Figure 5:
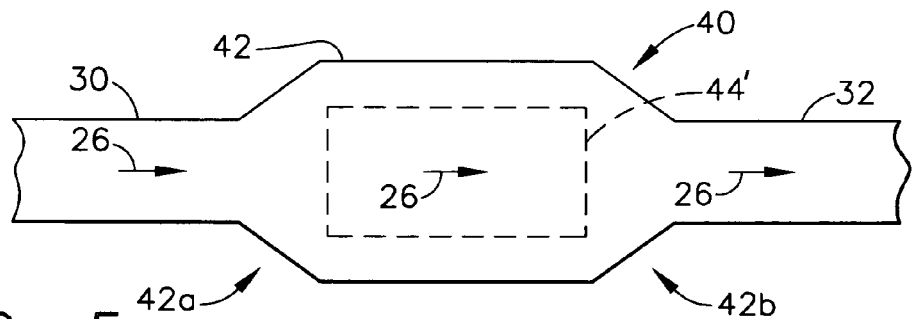
FIG. 5 is a cross-sectional view schematically representing passage of an air stream through a catalytic unit of a catalytic ozone removal system having a catalytic coated substrate housed within the catalytic unit, according to one embodiment of the invention.

FIG. 5 schematically represents passage of an air stream 26 through a catalytic unit 40 as seen in sectional view, according to one embodiment of the invention. Catalytic unit 40 may include housing 42, and a catalytic coated substrate 44' arranged within housing 42. Catalytic coated substrate 44' may comprise catalyst support 46 disposed on substrate 44, and catalytic composition 48 disposed on catalyst support 46, for example, as described with reference to FIG. 4. Housing 42 and substrate 44 may be adapted for the passage of air stream 26 therethrough, at a flow rate typically in the range of from about 5 to 500 pounds of air per minute, usually from about 10 to 250 pounds per minute, and often from about 20 to 200 pounds per minute. In FIG. 5, the direction of flow of air stream 26 is indicated by arrows.

Housing 42 may comprise a metal cylinder or the like, for example, as described with reference to FIG. 4. Housing 42 may include an upstream portion or end 42a, and a downstream portion or end 42b. First and second ducts 30, 32, may be affixed to upstream and downstream ends 42a, 42b, respectively. First duct 30 and second duct 32 may each comprise a conduit, such as a metal pipe, or the like. Each of upstream end 42a and downstream end 42b of housing 42 may comprise a transitional zone, which may be frusto-conical, or the like. First duct 30 may be coupled to air intake unit 20 for channeling air stream 26 to catalytic unit 40 (see, e.g., FIG. 1). Second duct 32 may channel cleansed air, from which ozone has been catalytically removed via catalytic unit 40, to ECS 60 (see, e.g., FIG. 2).

Figure 6A:
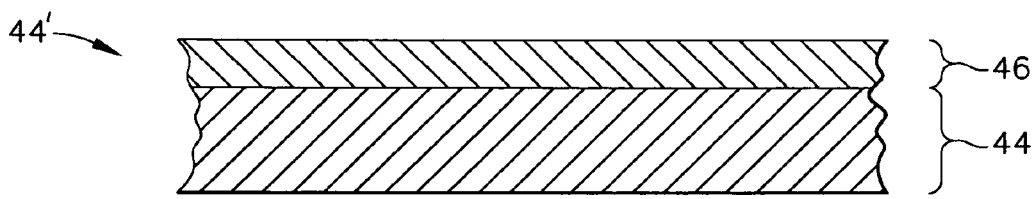
FIG. 6A is a cross-sectional view schematically representing a portion of a catalytic coated substrate for catalytic ozone removal, according to one aspect of the invention.

FIG. 6A is a cross-sectional view schematically representing a portion of catalytic coated substrate 44' for catalytic ozone removal from air stream 26, according to one embodiment of the invention, wherein catalyst support 46 is disposed on substrate 44. Catalyst support 46 and substrate 44 may have characteristics and features as described elsewhere herein, for example, with reference to FIGS. 4-5.

As an example, substrate 44 may comprise a metal or a ceramic, while catalyst support 46 may comprise a metal oxide, such as titania. Catalyst support 46 may be in the form of titania particles. Catalyst support 46 may have a thickness typically in the range of from about 10 to 100 microns, usually from about 20 to 100 microns, and often from about 30 to 90 microns. Catalyst support 46 may be present in an amount typically in the range of from about 1000 to 5000 g/ft$^3$ of substrate, usually from about 1500 to 5000 g/ft$^3$ of substrate, and often from about 1500 to 4000 g/ft$^3$ of substrate. Catalytic coated substrate 44' may further comprise a catalytic composition 48 disposed on or within catalyst support 46 (see, e.g., FIG. 6B). Herein, quantities of catalyst support 46 and of catalytic composition 48 may be expressed as g/ft$^3$ of substrate 44, it being understood that the volume (ft$^3$) represents the substrate envelope or perimeter (rather than solid volume of substrate 44).

Figure 6B:
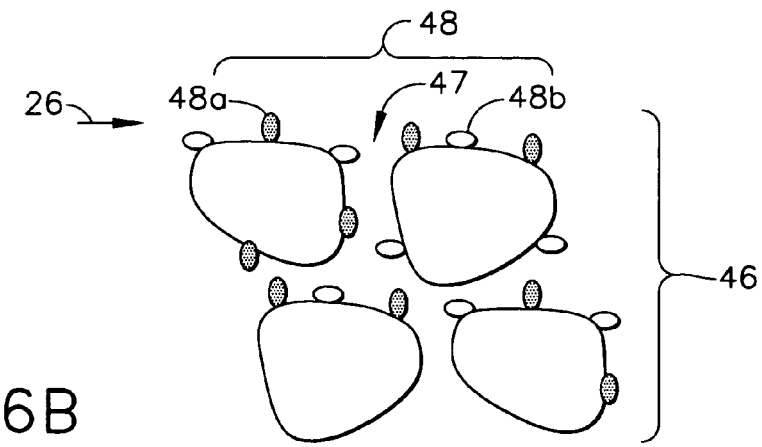
FIG. 6B is a cross-sectional view schematically representing a portion of a catalyst support of an ozone removal catalytic unit, according to one embodiment of the invention.

FIG. 6B is a cross-sectional view through a portion of catalyst support 46, according to the present invention. Catalyst support 46 may have a plurality of pores 47 therein. Catalytic composition 48 may be disposed on catalyst support 46 and within pores 47.

Catalytic composition 48 may comprise a first catalytic component 48a and a second catalytic component 48b. First catalytic component 48a may catalytically decompose ozone independently of second catalytic component 48b. Similarly, second catalytic component 48b may catalytically decompose ozone independently of first catalytic component 48a. First and second catalytic components 48a, 48b may be disposed on catalyst support 46 such that air stream 26, passed through catalytic unit 40, contacts first and second catalytic components 48a, 48b.

First catalytic component 48a may be capable of the efficient decomposition of ozone, e.g., capable of decreasing the ozone concentration in an air stream by at least 20 fold, within a first temperature range, while second catalytic component 48b may be capable of the efficient decomposition of ozone within a second temperature range. The first temperature range may typically be from about 100 to 300° F. or above.

Thus, temperatures within the first temperature range may be substantially below 300° F. The second temperature range may typically be 300° F. or above, e.g., in the range of from about 300 to 500° F. or above. Second catalytic component 48b may be reversibly deactivated at temperatures below the second temperature range, for example, at temperatures within the first temperature range between about 100 and 300° F. As an example, palladium oxide catalyst may be reversibly deactivated at temperatures below 300° F. In contrast, first catalytic component 48a may not be deactivated at even the lowest temperatures within the first temperature range, for example, silver metal is not deactivated at temperatures as low as 100° F.

Typically, when the temperature returns from the first temperature range to the second temperature range, deactivated second catalytic component 48b may regain the efficiency lost during exposure to the first temperature range. Changes in operation of turbine engine 28 during different flight segments (for example, during ascent, cruise at different altitudes, and descent), or changes in ambient air temperature at different altitudes and time of year (in the case of dedicated compressor 24) may change the temperature of ozone-containing air that reaches catalytic unit 40.

First catalytic component 48a may comprise silver metal, or silver oxide. Second catalytic component 48b may comprise palladium oxide (PdO), palladium dioxide (PdO$_2$), or palladium metal. In some embodiments, catalytic composition 48 may consist essentially of silver metal and palladium oxide (PdO).

Catalytic coated substrate 44' may be resistant to poisoning by sulfur and phosphorus compounds. In addition, catalytic coated substrate 44' may be resistant to poisoning by materials encountered in air derived from an aircraft air intake unit, such as lubricants, hydraulic fluids, sand or dust particles, and moisture (water). In some embodiments, resistance to poisoning of the catalytic coated substrate 44' of the present invention may be a function of the combination of a titania catalyst support with a first catalytic component comprising silver (Ag) metal and a second catalytic component comprising palladium oxide (PdO).

Figure 7:
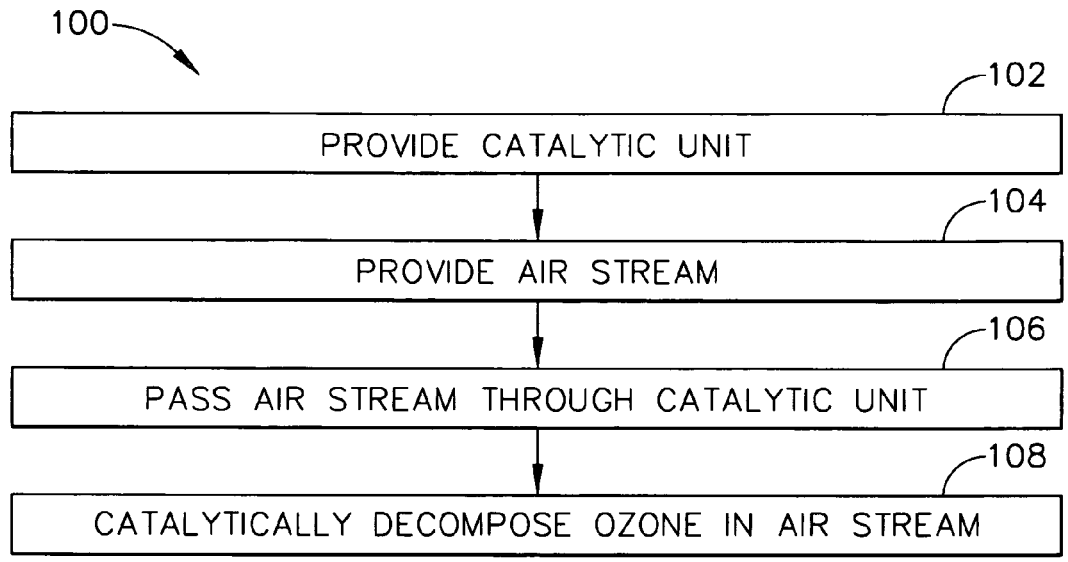
FIG. 7 schematically represents a series of steps involved in a method for removing ozone from an air stream, according to another embodiment of the invention.

FIG. 7 schematically represents a series of steps involved in a method 100 for removing ozone from an air stream, according to another embodiment of the invention. Step 102 may involve providing a catalytic unit of a catalytic ozone removal system, wherein the catalytic unit is adapted for the catalytic decomposition, destruction, or removal of ozone from an air stream. The catalytic unit may have those elements, features, and characteristics as described herein, e.g., with reference to FIGS. 4-5, 6A-B. For example, the catalytic unit may include a catalytic composition comprising first and second catalytic components, wherein the first and second catalytic components are adapted for the efficient catalytic decomposition of ozone at different temperatures, or within different temperature ranges. Temperature ranges for the catalytic decomposition of ozone by a catalytic unit of the present invention are described herein, for example, with reference to step 108 of method 100 (infra).

Step 104 may involve providing an air stream. The air stream provided in step 104 may be derived from ambient air, and may have an ozone concentration in the range of from about 0.2 to 2.0 ppm. The air stream provided in step 104 may be provided by a dedicated ambient air compressor. The air stream provided in step 104 by a dedicated ambient air compressor may be at a temperature of typically at least about 100° F., usually from about 100 to 500° F., and often from about 150 to 350° F. The temperature of the air stream provided in step 104 by a dedicated ambient air compressor may vary with atmospheric temperature.

Alternatively, the air stream provided in step 104 may be provided by bleed air from a compressor of a gas turbine engine. The air stream provided in step 104 by bleed air from a compressor of a gas turbine engine may be at a temperature typically in the range of from about 300 to 500° F., and usually from about 300 to 425° F., and often from about 300 to 400° F.

Step 106 may involve passing the air stream provided in step 104 through the catalytic unit provided in step 102. The catalytic unit may be adapted for promoting contact between ozone in the air stream and the catalytic composition of the catalytic unit, thereby facilitating catalytic destruction of the ozone. The catalytic unit may be adapted for the passage therethrough of the air stream at a flow rate typically in the range of from about 5 to 500 pounds per minute, usually from about 10 to 250 pounds per minute, and often from about 20 to 200 pounds per minute.

Step 108 may involve catalytically decomposing, via the catalytic composition, the ozone within the air stream supplied to the catalytic unit. Ozone may be catalytically decomposed via the catalytic composition to form molecular oxygen.

Ozone may be independently decomposed by one or both of the first and second catalytic components of the catalytic composition, depending on the temperature. For example, at a first temperature the ozone may be catalytically decomposed predominantly, or solely, by the first catalytic component, wherein the second catalytic component may be deactivated at the first temperature. The second catalytic component may recover its catalytic activity upon return to a higher temperature.

The first catalytic component may comprise a silver-based component, such as silver metal or silver oxide. The second catalytic component may comprise a palladium-based component, such as palladium oxide (PdO), palladium dioxide ($PdO_2$), or palladium metal. The palladium-based component may be reversibly deactivated at a temperature less than 300° F.

As a result of method 100, cleansed air may be provided having an ozone concentration of 0.1 ppm or less, as an example. Method 100 may be performed with the same catalytic unit, without maintenance or servicing thereof, for an operating period of at least 20,000 hours, or for a time period of not less than five years, as an example.

Figure 8:
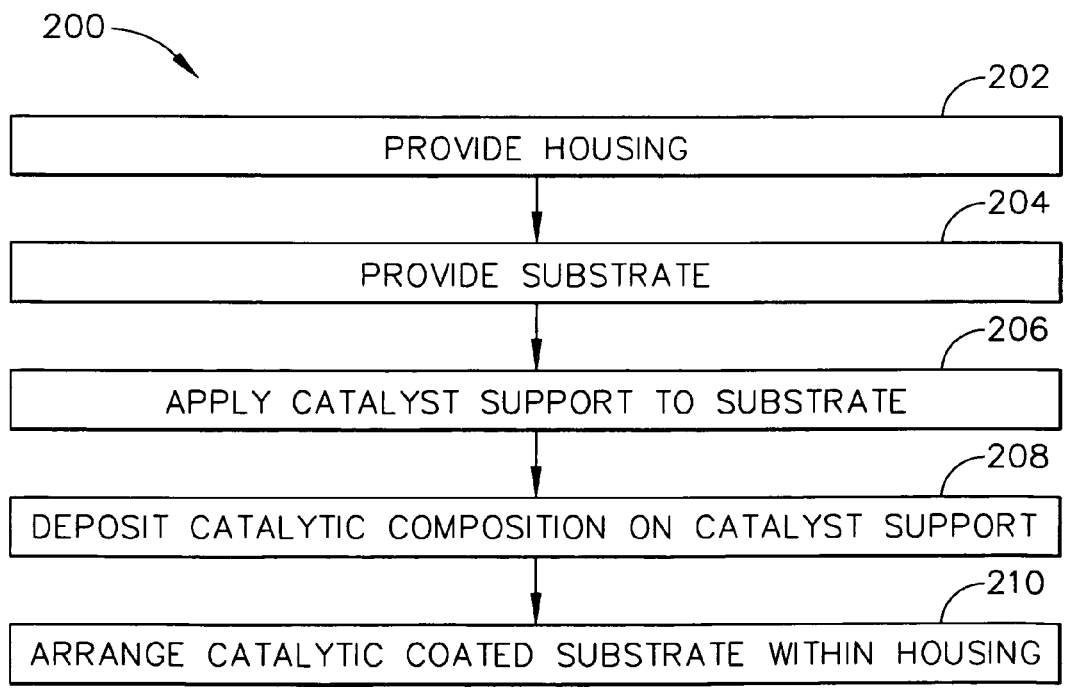
FIG. 8 schematically represents a series of steps involved in a method for making a catalytic unit, according to another embodiment of the invention.

FIG. 8 schematically represents a series of steps involved in a method 200 for making a catalytic unit, according to another embodiment of the invention, wherein step 202 may involve providing a housing. The housing provided in step 202 may include those features and characteristics as described herein for housing 42, for example, with reference to FIGS. 4-5.

Step 204 may involve providing a substrate. The substrate provided in step 204 may include those features and characteristics as described herein for substrate 44, for example, with reference to FIGS. 4-5.

Step 206 may involve applying a catalyst support to the substrate provided in step 204. The catalyst support applied to the substrate may comprise a metal oxide, such as titania. The catalyst support may be applied to the substrate as a slurry. As an example, the catalyst support may be applied to the substrate by dipping the substrate in a slurry of titania. After application of the catalyst support in the form of a slurry, the slurry may be dried prior to step 208 (infra).

The catalyst support may be applied to the substrate to form a layer of catalyst support on a surface of the substrate. The catalyst support may be applied to the substrate to a thickness typically in the range of from about 2 to 100 microns, usually from about 10 to 75 microns, and often from about 10 to 50 microns. The catalyst support may have a plurality of pores therein (see, e.g., FIG. 6B).

Step 208 may involve depositing a catalytic composition on the catalyst support. In some embodiments, the catalytic composition may be deposited on the catalyst support by applying an aqueous solution to the catalyst support, wherein the aqueous solution may comprise one or more catalyst precursor materials. Thereafter, the applied aqueous solution may be heated to transform the catalyst precursor materials to the catalytic composition (see, for example, method 400, FIG. 10, infra).

Step 208 may involve depositing the catalytic composition on the catalyst support in an amount sufficient to decrease the ozone concentration, in an air stream passed through the catalytic unit at a rate of up to 500 pounds of air per minute, by a factor of at least 20, i.e., in an amount sufficient to attain at least a 20 fold (20×) reduction in ozone concentration. For example, the catalytic composition may be present in the catalytic unit in an amount sufficient to decrease the ozone content of the air stream from a first concentration of about 2.0 ppm to a second concentration of 0.1 ppm or less.

In some embodiments, the first catalytic component of the catalytic composition may comprise at least one silver-based component, such as silver metal or silver oxide, in an amount typically in the range of from 50 to 500 $g/ft^3$ of substrate, usually from about 100 to 400 $g/ft^3$ of substrate, and often from about 250 to 350 $g/ft^3$ of substrate. The second catalytic component of the catalytic composition may comprise at least one palladium-based component, such as palladium oxide (PdO), palladium dioxide ($PdO_2$), or palladium metal, in an amount typically in the range of from 25 to 300 $g/ft^3$ of substrate, usually from about 50 to 250 $g/ft^3$ of substrate, and often from about 100 to 200 $g/ft^3$ of substrate.

As a result of steps 204 through 208, a catalytic coated substrate may be formed, wherein the catalytic coated substrate comprises a layer of catalyst support disposed on the substrate, and a catalytic composition disposed on the catalyst support.

Step 210 may involve arranging the catalytic coated substrate within the housing. The catalytic coated substrate may be accommodated within the housing such that an air stream may be passed over the catalytic coated substrate, and through the housing, at a flow rate in the range of typically from about 5 to 500 pounds of air per minute, usually from about 20 to 250 pounds of air per minute, and often from about 50 to 250 pounds of air per minute.

Figure 9:
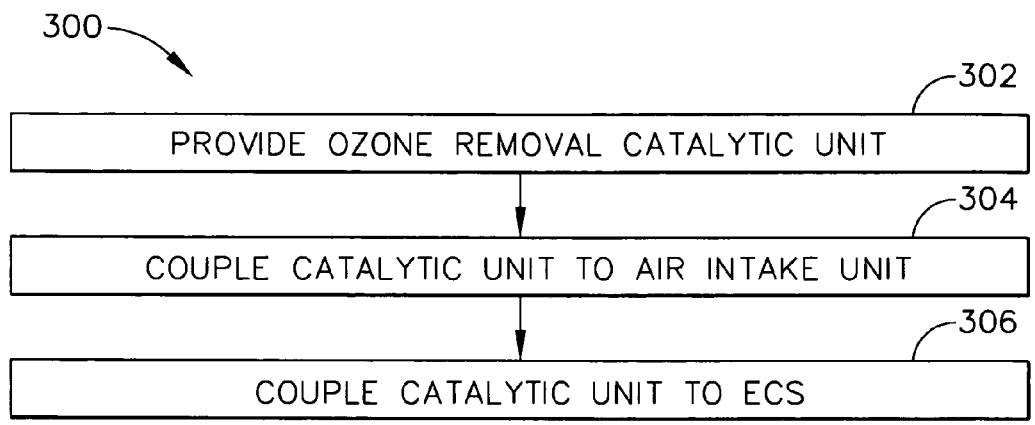
FIG. 9 schematically represents a series of steps involved in a method for making an ozone removal system, according to another embodiment of the invention.

FIG. 9 schematically represents a series of steps involved in a method 300 for making a catalytic ozone removal system, according to another embodiment of the invention. Step 302 may involve providing an ozone removal catalytic unit. The ozone removal catalytic unit may be provided generally according to method 200 (FIG. 8). For example, step 302 may involve providing a housing and a substrate, applying a catalyst support to the substrate, applying a catalytic composition to the catalyst support to provide a catalytic coated substrate, and arranging the catalytic coated substrate within the housing.

Step 304 may involve coupling the catalytic unit provided in step 302 to an air intake unit. Step 304 may involve coupling the upstream end of the housing of the catalytic unit to the air intake unit via a first duct. The air intake unit may be an air intake unit of an aircraft or other vehicle. In the case of an aircraft, the air intake unit may comprise a dedicated ambient air compressor. Step 304 may involve coupling the catalytic unit to an air intake unit such that an air stream generated by the air intake unit may be passed through the catalytic unit.

Step 306 may involve coupling the downstream end of the housing of the catalytic unit to an ECS of an aircraft via a second duct, whereby a stream of catalytically cleansed air, having an ozone concentration of 0.1 ppm or less, can be supplied to the ECS at a flow rate of typically up to about 500 pounds of air per minute. Thereafter, the stream of catalytically cleansed air can be supplied to the cabin of an aircraft or other interior air space. Each of the first duct and the second duct may comprise a conduit such as a metal pipe, and the like.

Figure 10:
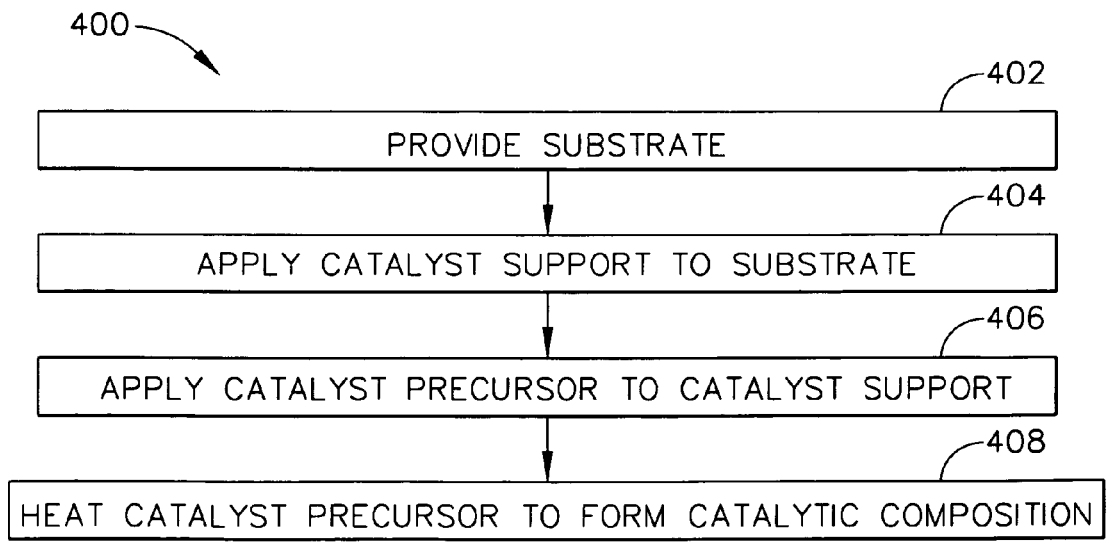
FIG. 10 schematically represents a series of steps involved in a method for preparing a catalytic coated substrate for a catalytic ozone removal system, according to another embodiment of the invention.

FIG. 10 schematically represents a series of steps involved in a method 400 for preparing a catalytic coated substrate for a catalytic ozone removal system, according to another embodiment of the invention. Step 402 may involve providing a substrate. The substrate may be provided generally according to step 204 of method 200 (FIG. 8).

Step 404 may involve applying a catalyst support to the substrate. The catalyst support may be applied as a slurry comprising a metal oxide, such as titania. The catalyst support may be applied to the substrate generally according to step 206 of method 200 (FIG. 8). The catalyst support may be dried prior to step 406 (infra). The catalyst support may have a plurality of pores therein.

Step 406 may involve applying a catalyst precursor to the catalyst support. In some embodiments, the catalyst precursor may be applied to the catalyst support by applying an aqueous solution to the catalyst support. Thereafter, the applied aqueous solution may be heated (step 408, infra) to transform the catalyst precursor to the (active) catalytic composition. Optionally, the aqueous solution may be allowed to dry under ambient conditions on the catalyst support prior to the heating step.

The applied aqueous solution may comprise at least a first catalytic precursor, and optionally may further comprise at least a second catalytic precursor. The first catalytic precursor may be transformed, by exposure to heating in air, to the first catalytic component of the catalytic composition, and the second catalytic precursor may be transformed, by exposure to heating in air, to the second catalytic component of the catalytic composition.

As an example, the first catalytic precursor may be a silver compound, such as an organometallic silver compound or a silver salt. Similarly, the second catalytic precursor may be a palladium compound, such as an organometallic palladium compound or a palladium salt. Thus, an aqueous solution applied to the catalyst support may comprise a mixture of an organometallic silver compound or a silver salt and an organometallic palladium compound or a palladium salt in water. A silver salt or a palladium salt of the aqueous solution may be an acid salt or a basic salt. Examples of silver and palladium salts include palladium nitrate and silver nitrate. In some embodiments, the first and second catalytic precursors may be applied separately to the catalyst support, by applying a separate solution for each of the first and second catalytic precursors, with a calcining step after application of each solution.

Step 408 may involve heating the first and second catalytic precursors of the applied aqueous solution to a temperature typically in the range of from about 200 to 600° C., usually from about 250 to 550° C., and often from about 400 to 550° C. In some embodiments, the rate of heating may be carefully controlled to promote, or ensure, the even distribution of the catalytic composition on or within the catalyst support. Thus, step 408 may involve heating at a substantially constant rate from ambient temperature such that the maximum temperature of the heat treatment is attained within a time period in the range of typically from about 30 minutes to 2 hours. As an example, for a heat treatment having a maximum temperature of 500° C., the temperature may be raised from about 20° C. to 500° C. at a rate of about 12° C. per minute for a time period of 40 minutes.

During the heat treatment of step 408, a first catalyst precursor applied in step 406, and which may comprise an organometallic silver compound or a silver salt, may be transformed to silver (Ag) metal. Similarly, a second catalyst precursor applied in step 406, and which may comprise an organometallic palladium compound or a palladium salt, may be transformed to palladium oxide (PdO) during step 408. Further, by appropriate control of the heating rate, the Ag metal and PdO may be evenly distributed on or within the catalyst support. The Ag metal and PdO, or other catalytic composition, may be disposed within the pores of the catalyst support (see, e.g., FIG. 6B). An air stream passed though the catalytic unit of the present invention may pass over, and make contact with, the catalytic composition disposed within the pores.

According to the instant invention, a palladium oxide catalytic component on a titania support may be capable of the efficient catalytic decomposition of ozone, during at least 20,000 hours of maintenance-free operation, over a temperature range of from about 100° F. to 400° F. and above. Palladium oxide may be catalytically reversibly deactivated when exposed to temperatures below about 300° F. The catalytic activity of palladium oxide may be restored upon returning to higher temperatures. In contrast, silver metal on a titania support may be capable of the efficient catalytic decomposition of ozone, during at least 20,000 hours of. maintenance-free operation, over a temperature range from about 100° F. to 300° F. and above. The catalytic decomposition of ozone by silver metal over this latter temperature range occurs independently of the activity of palladium oxide.

Especially on aircraft with dedicated ambient air compressors, the temperature of the air stream supplied to catalytic unit 40 may vary according to the season and altitude. Sometimes the operating temperature may be well below 300° F., and at other times may be about 400° F. Therefore, one advantage of the present invention is that the catalytic efficiency can be applied during all conditions by using a combination of catalysts whose combined optimum operating temperatures cover the range of from about 100 to at least 500° F. While operating at low temperature, the palladium oxide deactivates while the silver metal has high efficiency for the ozone conversion. Upon return of the operating temperature above 300° F., palladium oxide regains its high efficiency.

It should be understood, of course, that the foregoing relates to exemplary embodiments of the invention and that modifications may be made without departing from the spirit and scope of the invention as set forth in the following claims.

We claim:

1. An ozone removal system for an aircraft, comprising:
   a housing having an upstream end and a downstream end;
   a substrate disposed within said housing, said substrate and said housing adapted for the passage of an air stream therethrough;
   a titania catalyst support disposed on a surface of said substrate;
   a first duct affixed to said upstream end of said housing, said first duct coupled to an air intake unit for providing said air stream; and
   a catalytic composition disposed on said titania catalyst support, said catalytic composition consisting of:
      a first catalytic component, wherein the first catalyst component is a silver-based component selected from the group consisting of Ag (silver) metal and AgO (silver oxide), and
      a second catalytic component, wherein the second catalyst component is a palladium-based component selected from the group consisting of PdO (palladium oxide) and PdO2 (palladium dioxide), wherein said catalytic composition is adapted for the catalytic removal of ozone from said air stream at temperatures within the range of from about 100 to 500° F.; and wherein the ozone removal system is resistant to poisoning by sulfur and phosphorus compounds.

2. The ozone removal system of claim 1, wherein said air stream has a flow rate of from about 1 to 500 pounds of air per minute.

3. The ozone removal system of claim 1, wherein said catalytic composition is provided in an amount sufficient to decrease a first ozone concentration in said air stream of about 2.0 ppm to a second ozone concentration of 0.1 ppm or less.

4. The ozone removal system of claim 1, wherein said air intake unit comprises a dedicated ambient air compressor of said aircraft.

5. An ozone removal system, comprising:
a housing having an upstream end and a downstream end;
a substrate disposed within said housing;
a layer of titania disposed on a surface of said substrate;
a catalytic composition disposed on said layer of titania, said catalytic composition consisting of:
a first catalytic component capable of efficient decomposition of ozone within a first temperature range, wherein the first catalyst component is a silver-based component selected from the group consisting of Ag (silver) metal and AgO (silver oxide),
a second catalytic component capable of efficient decomposition of ozone within a second temperature range, wherein the second catalyst component is a palladium-based component selected from the group consisting of PdO (palladium oxide) and PdO2 (palladium dioxide),
wherein said first temperature range is from about 100 to 300° F.; and
wherein the ozone removal system is operable for at least 20,000 hours without catalyst deactivation.

6. The ozone removal system of claim 5, wherein said second catalytic component is PdO (palladium oxide), and said second temperature range is from about 300 to 500° F.

7. The ozone removal system of claim 6, wherein said second catalytic component is reversibly deactivated at temperatures below said second temperature range.

8. A catalytic system for removing ozone from an air stream, comprising:
an air intake unit for providing said air stream;
a catalytic unit disposed downstream from said air intake unit;
a first duct affixed to an upstream end of said catalytic unit, said first duct adapted for channeling said air stream to said upstream end of said catalytic unit; and
a second duct affixed to a downstream end of said catalytic unit, wherein said catalytic unit comprises:
a housing;
a substrate disposed within said housing;
a layer of titania disposed on a surface of said substrate; and
a catalytic composition disposed on said layer of titania, said catalytic composition consisting of a first catalytic component adapted for efficient removal of ozone from an air stream within a first temperature range, and a second catalytic component adapted for efficient removal of ozone from an air stream within a second temperature range, wherein said first catalytic component consists of silver, said second catalytic component consists of palladium oxide (PdO), and wherein said second catalytic component is reversibly deactivated at temperatures below said second temperature range, wherein said second temperature range is from about 300 to 500° F.

9. The catalytic system of claim 8, wherein:
said second duct is coupled to an environmental control system of an aircraft, and
said second duct is adapted for channeling said air stream to said environmental control system.

10. The catalytic system of claim 8, wherein:
said layer of titania is present in an amount of from about 1500 to 5000 g/ft3 of said substrate.

11. The catalytic system of claim 8, wherein:
said catalytic composition is present in an amount sufficient to decrease an ozone concentration in said air stream by at least twenty fold (20×).

12. The catalytic system of claim 8, wherein:
said silver is in an amount of from 50 to 500 g/ft3 of said substrate, and
said PdO is in an amount of from 25 to 300 g/ft3 of said substrate, and wherein:
said catalytic unit is adapted for providing cleansed air having an ozone concentration of 0.1 ppm or less.

13. The catalytic system of claim 8, wherein:
said air stream is provided by bleed air from a gas turbine engine, and
said air stream has a temperature of at least about 100° F.

14. The catalytic system of claim 8, wherein:
said air stream is provided by a dedicated ambient air compressor of an aircraft, and
said air stream has a temperature below 500° F.

15. An aircraft having an interior air space, comprising:
an ozone removal system including a catalytic unit, said catalytic unit in communication with said interior air space, and said catalytic unit adapted for passage of an air stream therethrough at a flow rate of from about 1 to 500 pounds of air per minute, wherein said catalytic unit consists of a first catalytic component adapted for efficient catalytic removal of ozone from said air stream over a first temperature range, and a second catalytic component adapted for efficient catalytic removal of ozone from said air stream over a second temperature range, wherein said first temperature range is from about 100 to 300° F., and wherein said second temperature range is from about 300 to 500° F., and wherein said catalytic unit further comprises:
a substrate;
a titania catalyst support disposed on said substrate; and
a catalytic composition disposed on said titania catalyst support, said catalytic composition consisting of said first catalytic component and said second catalytic component, said first catalytic component consisting essentially of silver, and said second catalytic component consisting essentially of PdO (palladium oxide).

16. The aircraft of claim 15, wherein said ozone removal system further comprises an air intake unit for providing said air stream to said catalytic unit, and wherein said air intake unit comprises a dedicated ambient air compressor.

17. The aircraft of claim 15, wherein said interior air space includes an aircraft cabin, and said catalytic unit is capable of catalytically removing ozone from said air stream to provide cleansed air, having an ozone level of 0.1 ppm or less, to said aircraft cabin.

* * * * *